United States Patent [19]

Walden

[11] 3,895,848

[45] July 22, 1975

[54] TAPE STORAGE CONTAINER FOR AUTOMOBILES

[76] Inventor: Richard D. Walden, 225 Pecan Dr., Martinez, Ga. 30907

[22] Filed: Nov. 14, 1973

[21] Appl. No.: 415,743

[52] U.S. Cl. .................................. 312/236; 312/213

[51] Int. Cl.[2] .............................................. A47B 7/08

[58] Field of Search ........... 312/107, 108, 111, 213, 312/214, 245, 246; 98/2.01

[56] References Cited

UNITED STATES PATENTS

| | | | |
|---|---|---|---|
| 1,941,363 | 12/1933 | Norviel | 98/2.01 |
| 2,275,373 | 3/1942 | Barrett | 312/248 |
| 2,650,534 | 9/1953 | Schneider | 98/2.01 |
| 3,184,275 | 5/1965 | Gardner | 312/213 |
| 3,241,899 | 3/1966 | Donker | 312/213 |
| 3,627,398 | 12/1971 | Reese | 312/246 |
| 3,677,396 | 7/1972 | Staar | 312/246 |

*Primary Examiner*—Casmir A. Nunberg
*Attorney, Agent, or Firm*—Jones, Thomas & Askew

[57] ABSTRACT

A container for storing magnetic tape cassettes in automobiles includes a housing with a front opening that is closable by a pervious door hinged at its bottom to the housing. A fan connected to the rear of the housing is actuated by a temperature responsive switch. Baffles and partitions within the housing direct the flow of air about each of the tape cassettes stored within the housing.

1 Claim, 4 Drawing Figures

TAPE STORAGE CONTAINER FOR AUTOMOBILES

BACKGROUND OF THE INVENTION

The use of magnetic tapes for sound reproduction in automobiles has become popular in recent years, and while many automobiles are sold to the purchaser with tape decks for the purpose of playing the magnetic tapes, the storage of tape cartridges or cassettes in automobiles is still somewhat unsatisfactory. The owner of an automobile having a tape deck installed therein usually desires to have several tape cassettes at hand and ready for insertion into the tape deck. A few manufacturers have provided trays or containers for temporarily storing tape cassettes in automobiles; however, only a few tape cassettes can be handled by the present tape storage devices, the tape cassette storage devices do not maintain the cassettes in an orderly storage configuration, and the present day storage devices usually keep the tape cassettes out in the open area of the automobile where the container and its tape cassettes and magnetic tape are exposed to heat radiation from the sum and to conduction and convection heat transfer within a closed vehicle, thereby subjecting the tape cassettes and magnetic tape inside the cassettes to deterioration from excessive heat.

SUMMARY OF THE INVENTION

Briefly described, the present invention comprises a tape storage container for automobiles wherein tape cartridges or cassettes can be orderly stored for accessible retrieval and insertion into a tape deck. The container maintains the tape cassettes in spaced upright positions within a housing and the container is connectable to the lower portion of the instrument panel of an automobile and is therefore usually shielded from heat radiation from the sun. A temperature responsive switch actuates a fan at the rear of the container to circulate air through the container and between the spaced apart tape cartridges within the container in the event the temperature within the housing exceeds a predetermined level.

Thus, it is an object of the present invention to provide a tape storage container for automobiles which maintains the tapes in an orderly arrangement for easy retrieval and insertion into the tape deck of the automobile and which avoids damage of the tapes and the tape cartridges from heat.

Other objects, features, and advantages of the present invention will become apparent when reading the following specification, when taken in conjunction with the accompanying drawing.

DESCRIPTION OF THE PREFERRED EMBODIMENT

Figure 2:
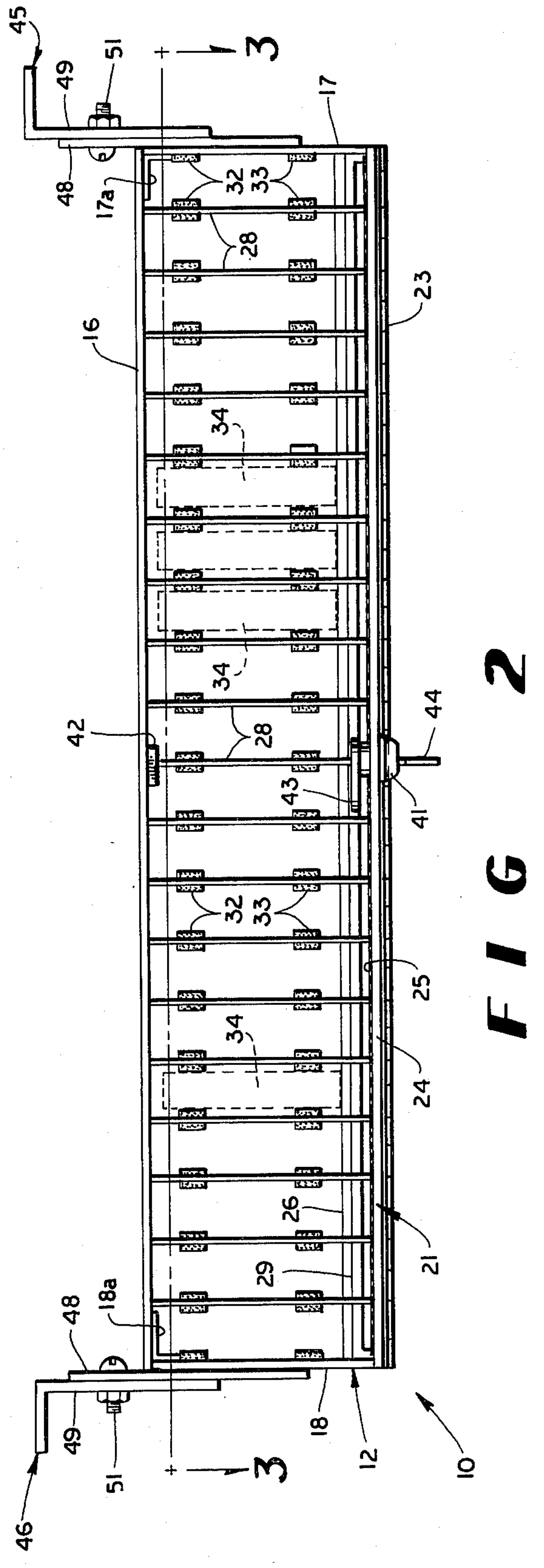
FIG. 2 is a front view of the tape storage container, showing the door in its open position.
Figure 4:
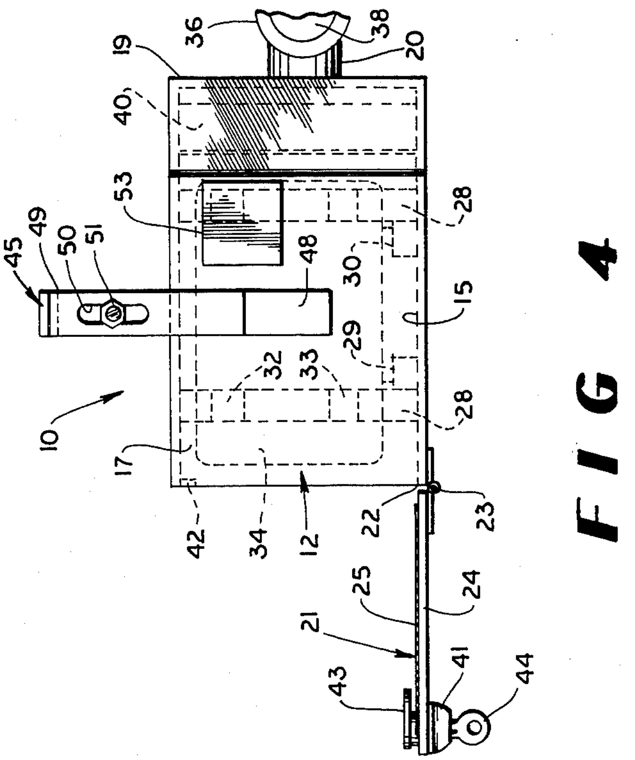
FIG. 4 is an end view of the tape storage container, showing the door in its open position.
Figure 1:
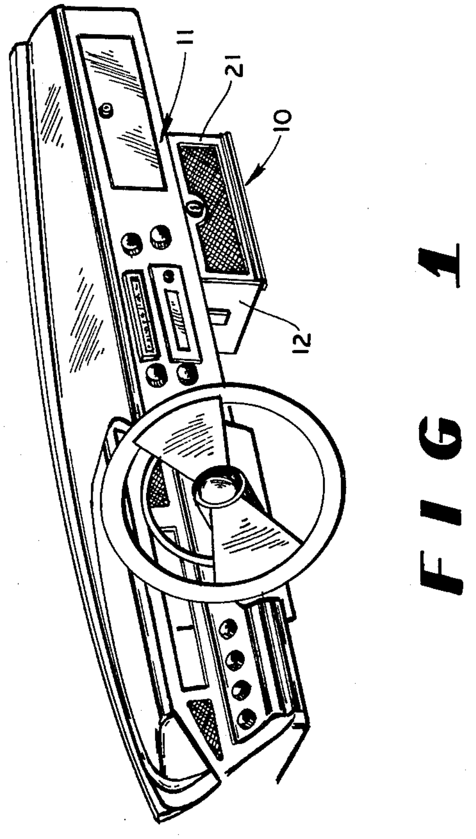
FIG. 1 is a perspective view of the tape storage container as it would be mounted in an automobile.

Referring now in more detail to the drawings, in which like numerals indicate like parts throughout the several views, FIG. 1 shows tape storage container 10 as it would be mounted in an automobile, beneath the instrument panel or "dash board" 11 of an automobile. Tape storage container 10 comprises a housing 12 which includes bottom wall 15 (FIG. 3), top wall 16 (FIG. 2), side walls 17 and 18, and rear wall 19. Bottom and top walls 15 and 16 are substantially flat and are spaced apart in parallel relationship with respect to each other, while side walls 17 and 18 also are substantially flat and also are spaced apart in parallel relationship with respect to each other. Rear wall 19 bows outwardly from the housing and defines air opening 20 at its center portion. Housing 12 is therefore substantially rectangular and is open at its front. Side walls 17 and 18 each include inwardly turned tabs or bracket elements **17*a* and 18*a* at their upper portions, and top wall 16 rests upon and is secured to tabs 17*a* and 18*a* by means of a conventional connector, such as by a bolt. Thus, top wall 16** can be removed from the housing for purposes of cleaning the housing.

Door 21 is of a length and height approximately equal to the length and height of the housing and is hinged at its lower edge 22 by means of piano hinge 23 to bottom wall 15 at its forward edge. The structure of piano hinge 23 s conventional and causes door 21 to pivot from its closed position where it substantially closes housing 12 through 90° to where it protrudes outwardly from the housing in an attitude approximately parallel to bottom wall 15. Door 21 is pervious in that in the preferred embodiment of the invention it comprises a rectangular frame 24 and wire cloth rigidly connected to the frame. Thus, air can move through door 21, and the contents within housing 12 can be viewed through the door.

Figure 3:
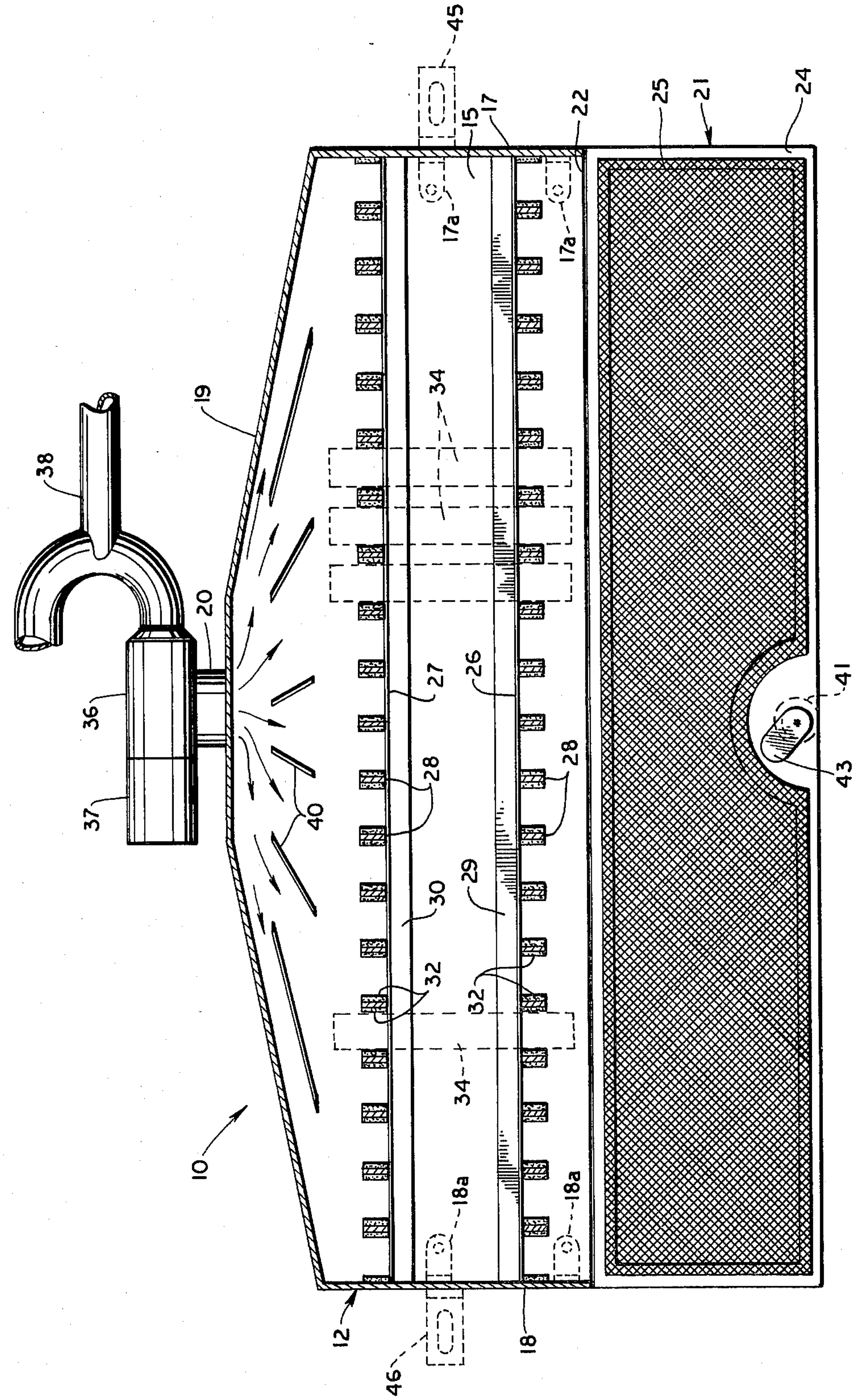
FIG. 3 is a top cross sectional view of the tape storage container, showing the door in its open position.

Two series 26 and 27 of upright partitions 28 are located within housing 12. Partitions 28 are equally spaced from one another across the internal area of housing 12, and the series 26 is spaced forwardly of the series 27, as illustrated in FIG. 3. Each series of partitions 26 and 27 includes a platform bracket 29 and 30 which is rigidly connected to each partition 28 and which functions as a platform on which a tape cassette will rest. The partitions 28 and platform brackets 29 and 30 are fused together so that the partitions and brackets are rigidly connected to one another. Each partition includes upper and lower protrusions 32 and 33 on its opposite sides. Protrusions 32 and 33 are fabricated from soft material, such as felt, so as to function as cushion protrusion elements, and the protrusions extend from the partitions into the spaces between the partitions for engagement with tape cassettes 34 which can be inserted into the spaces between the partitions. The spacing of the partitions is greater than the width of the typical tape cartridge, and the extent which the felt protrusions 32 and 33 extend into the space between the partitions is sufficient to cause the surfaces of the felt protrusions to resiliently engage the tape cartridges, to hold the tape cartridges firmly in position and to prevent them from rattling due to vibrations or other motions imparted to the housing during the operation of the automobile. The surface texture of the felt protrusions allows the tape cartridges to be inserted into and withdrawn from the spaces between the partitions. Since each partition 28 of the first series of upright partitions 26 is in alignment with a partition 28 in the second series of upright partitions 27, each tape cartridge inserted in housing 12 will normally rest upon the front and rear platform brackets 29 and 30 with the upper and lower felt protrusions 32 and 33 in engagement with the tape cartridge. Thus, each tape cartridge 34 in housing 12 will be frictionally engaged with eight felt protrusions.

Partitions 28 and their upper and lower protrusions 32 and 33 are relatively narrow and maintain the tape cartridges 34 in relatively close spaced relationship with respect to one another; however, the space between adjacent ones of the tape cartridges 34 is not closed since the felt protrusions do not extend the entire height of the partitions 28. Thus, the partitions, their protrusions and related elements function as separating means for maintaining the plurality of tape cassettes in spaced upright positions within the housing.

Fan 36 and its motor 37 are mounted on the rear wall 19 of housing 12, and fan 36 communicates with air opening 20 in rear wall 19. Conduit 38 communicates with fan 36, and fan 36 is arranged to move air through rear wall 19. In the preferred embodiment of the invention, conduit 38 communicates through its other end (not shown) with ambient air outside the automobile, and fan 36 is arranged to draw air in through conduit 38 and urge air into housing 12 through rear wall 19. This causes the fan to move ambient air from outside the automobile into the housing since the ambient air will usually be cooler than the air inside the automobile during the operation of fan 36.

A series of baffles 40 are located within housing 12 just inside the opening 20 of rear wall 19, and the baffles function as air directing means for distributing air from the fan about the interior of the housing behind the tape cartridges 34. The baffles 40 form a part of the rear wall and assist in keeping the tape cartridges 34 from moving too far to the rear inside housing 12, as well as functioning to distribute air from the fan throughout the housing.

A lock 41 is mounted in the upper edge of door 21, and a keeper 42 extends downwardly from top wall 16. Lock 41 is conventional in its construction and its movable locking element 43 simply pivots to engage and disengage keeper 42 upon rotation of key 44. If desired, other types of lock means can be used, including simple latches or other closure devices. In the preferred embodiment of the invention, the lock will be a key type lock so that the container can be locked and the key withdrawn for security purposes.

Mounting brackets 45 and 46 are connected to side walls 17 and 18 so that the housing 12 can be suspended below the instrument panel of the automobile. The brackets are adjustable in that they each comprise a first metal strap member 48 connected at its lower portion to a side wall and an L-shaped second strap member 49. At least one of the straps 48 or 49 of each bracket 45 and 46 defines an elongated slot such as the slot 50 in strap 49, and a bolt 51 is insertable through the slot and an opening in the other strap and is tightened to hold the bracket halves together.

A bimetallic switch unit 53 is mounted on housing 12 at side wall 17. Switch 53 is temperature responsive in that it functions to close after the temperature surrounding the switch has exceeded 150°F. Switch 53 is electrically connected to motor 37 of fan 36 and to the ignition system of the automobile, and functions to energize the motor and thus the fan of the container 10. While the temperature setting of switch 53 can be varied as desired, it is anticipated that the switch will be set to close at 150°F. since this is a temperature slightly below the temperature at which most tape cassettes will experience heat deterioration.

When the temperature responsive switch 53 closes, motor 37 is energized to operate fan 36. Fan 36 functions to draw ambient air from outside the automobile through conduit 38 and then expel the air through the opening 20 and the rear wall 19 of housing 12. The baffles 40 function as air directing means for distributing the air from the fan about the interior of the housing behind the tape cassettes 34.

The tape cassettes 34 are inserted in the aligned spaces between the aligned partitions 28 of the front and rear series 26 and 27 of upright partitions, and the upper and lower felt protrusions 32 and 33 engage each tape cassette and hold them in closely spaced apart upright relationship inside housing 12. The air passing into housing 12 from fan 36 is permitted to pass between the tape cassettes 34 and then out through the pervious door 21 into the interior of the automobile.

When the owner of the vehicle wishes to use one of the tape cassettes 34, he inserts his key in the lock 41 of the container and pivots the door 21 downwardly about its horizontal lower piano hinge 23, until the door rests at its 90° open position, as illustrated in the drawing. Each tape cassette 34 is then exposed and can be easily withdrawn from the container, and a cassette being removed from the tape deck can be easily reinserted back into the container. Since the rear wall 19 of the container faces the normal forward direction of movement of the automobile, the tape cassettes 34 will stay in the container even though the door of the container is open and the operator of the vehicle applies the brakes to decelerate the vehicle. Also, the engagement of the felt protrusions with each tape cassette usually is sufficient to hold the tape cassettes inside the container even though the door of the container is in its open position and the vehicle is accelerated by its operator. Should the acceleration be so swift or the engagement of some of the felt protrusions not be sufficient to hold one or more of the tape cassettes within the container, a tape cassette being moved outwardly from the interior of the housing 12 will subsequently come to rest on the door 21 before the tape falls to the interior of the automobile. Thus, door 21 functions as a means for catching any tape cassette which is not properly held in one of the spaces between the upright partitions in the container.

While door 21 has been disclosed as being fabricated from a frame 24 and wire cloth 25, it will be understood that various other materials can be utilized for visually exposing the tape cassettes without allowing physical access to the tape cassettes. For instance, expanded metal or other latticework or apertured plexiglass as well as various other suitable materials could be utilized.

While this invention has been described in detail, with particular reference to preferred embodiments thereof, it will be understood that variations and modifications can be effected within the spirit and scope of the invention as described hereinbefore and as defined in the appended claims.

I claim:

1. A tape storage container for automobiles for storing magnetic tapes, said container comprising a housing including spaced parallel top and bottom walls, spaced parallel side walls, a pervious door selectively covering a front opening of said housing, a hinge on said door connecting said door to said bottom wall, lock means for locking said door in closed relationship with said front opening, a series of partition means spaced across said housing parallel to said side walls defining spaces therebetween for receipt of a tape, cushion protrusion elements carried by said partition means and extending into said spaces for engaging a tape received within said space, fan means rearwardly of said housing and in communication with said housing a rear wall on said housing rearwardly of said partition means, said fan means communicating with said housing through said rear wall, a plurality of air directing means between said rear wall and said partition means, said air directing means being arranged to direct air from said fan means into said spaces, conduit means communicating with said fan means and with outside ambient air, and temperature responsive means within said housing for energizing said fan means, the arrangement being such that energizing said fan means causes outside air to be directed into said spaces and to pass between said partition means and a tape received within said spaces to be discharged through said pervious door.

* * * * *